(12) United States Patent
Choi et al.

(10) Patent No.: US 12,430,897 B2
(45) Date of Patent: Sep. 30, 2025

(54) METHOD AND APPARATUS FOR PROCESSING IMAGE, AND VEHICLE HAVING THE SAME

(71) Applicants: HYUNDAI MOTOR COMPANY, Seoul (KR); KIA CORPORATION, Seoul (KR)

(72) Inventors: Jong Hyun Choi, Seoul (KR); Junsik An, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 494 days.

(21) Appl. No.: 18/078,368

(22) Filed: Dec. 9, 2022

(65) Prior Publication Data

US 2023/0230366 A1 Jul. 20, 2023

(30) Foreign Application Priority Data

Jan. 17, 2022 (KR) .................. 10-2022-0006459

(51) Int. Cl.
*G06V 10/776* (2022.01)
*G06V 10/74* (2022.01)
*G06V 10/764* (2022.01)
*G06V 10/82* (2022.01)
*G06V 20/56* (2022.01)

(52) U.S. Cl.
CPC .......... *G06V 10/776* (2022.01); *G06V 10/761* (2022.01); *G06V 10/764* (2022.01); *G06V 10/82* (2022.01); *G06V 20/56* (2022.01)

(58) Field of Classification Search
CPC .... G06V 10/776; G06V 10/761; G06V 10/82; G06V 10/764; G06V 20/56
See application file for complete search history.

(56) References Cited

U.S. PATENT DOCUMENTS

| | | | |
|---|---|---|---|
| 8,379,994 B2* | 2/2013 | Dai | G06V 10/7715 382/160 |
| 11,062,210 B2* | 7/2021 | Aytekin | G06N 3/04 |
| 2018/0253866 A1* | 9/2018 | Jain | G06F 18/2431 |
| 2019/0034822 A1* | 1/2019 | Farré Guiu | G06N 5/022 |
| 2020/0302287 A1* | 9/2020 | Tachibana | G06N 3/04 |
| 2020/0342597 A1* | 10/2020 | Chukka | G06T 7/194 |
| 2020/0372324 A1* | 11/2020 | Yamauchi | G06N 3/08 |
| 2021/0182687 A1 | 6/2021 | Son et al. | |

(Continued)

FOREIGN PATENT DOCUMENTS

| | | | |
|---|---|---|---|
| KR | 10-2020-0036352 A | 4/2020 | |
| KR | 10-2020-0087335 A | 7/2020 | |

*Primary Examiner* — Utpal D Shah
(74) *Attorney, Agent, or Firm* — MORGAN, LEWIS & BOCKIUS LLP

(57) ABSTRACT

A method and apparatus of processing an image and a vehicle including the same includes obtaining image information; inputting a ground truth; inputting the image information to an object recognition model to output recognition information including a position and a type of an object included in the image information; generating misrecognition data based on the output recognition information and the ground truth; generating a weak pattern map of the object recognition model by processing the misrecognition data; and classifying a weak database based on the weak pattern map and at least one piece of pre-stored image information.

19 Claims, 8 Drawing Sheets

(56) References Cited

U.S. PATENT DOCUMENTS

| | | | |
|---|---|---|---|
| 2022/0245936 A1* | 8/2022 | Valk | G06V 20/13 |
| 2022/0301308 A1* | 9/2022 | Hsiao | G06V 20/49 |
| 2024/0044669 A1* | 2/2024 | Jang | G01C 21/3841 |
| 2024/0428940 A1* | 12/2024 | Kondo | G16H 50/20 |

* cited by examiner

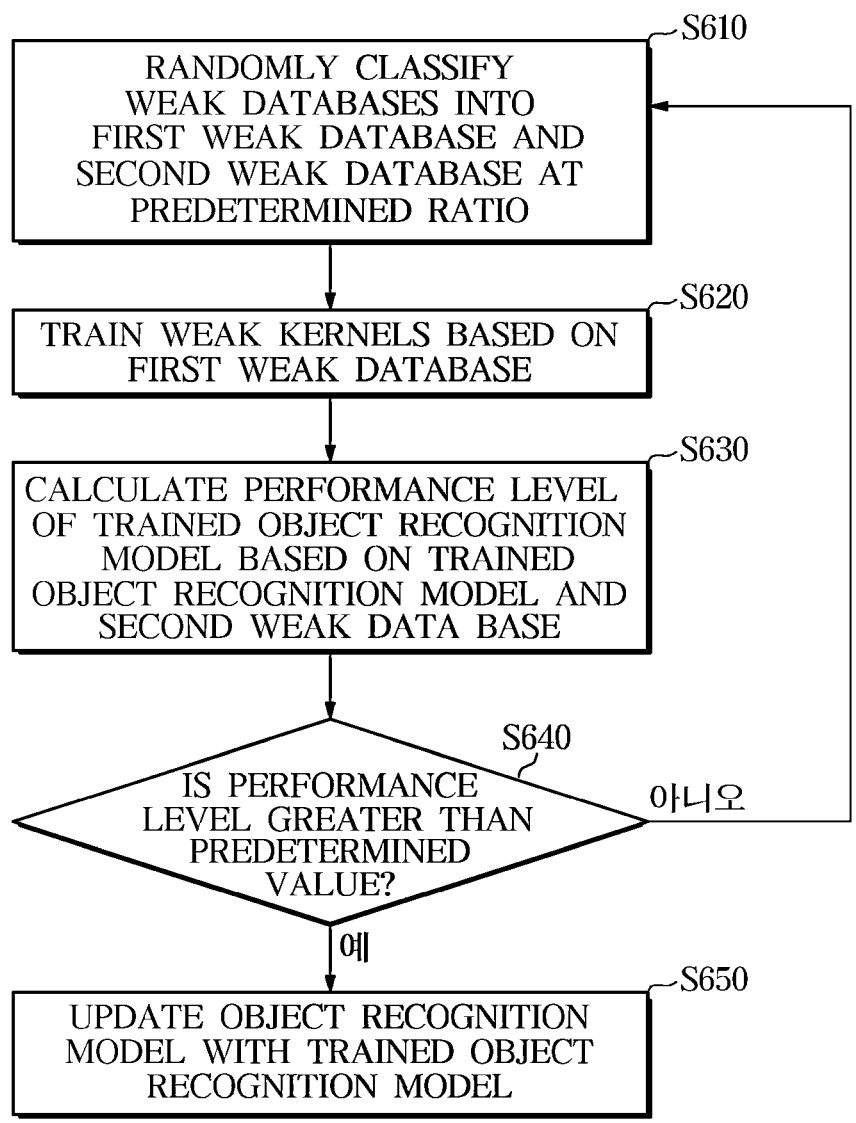

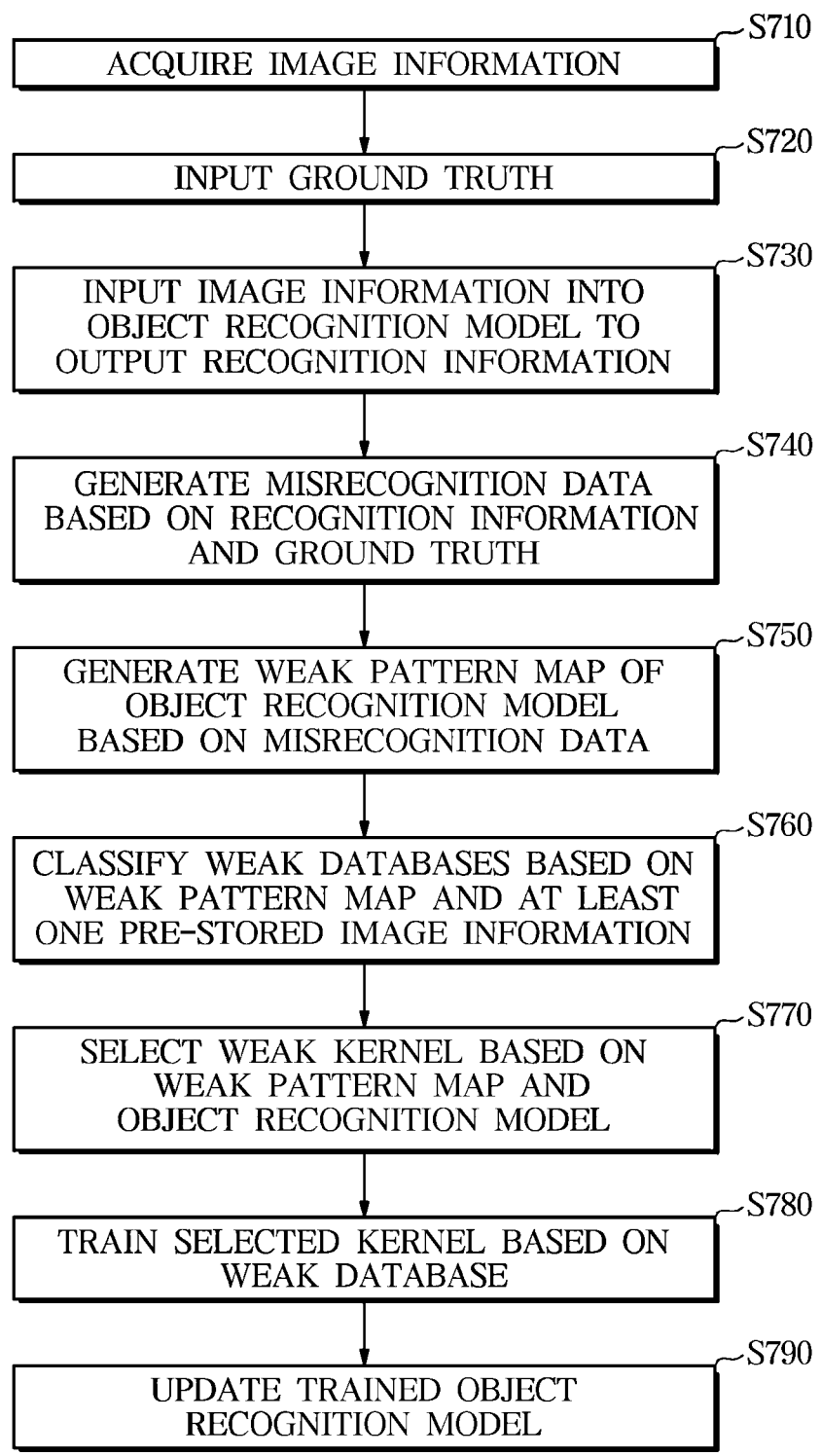

METHOD AND APPARATUS FOR PROCESSING IMAGE, AND VEHICLE HAVING THE SAME

CROSS-REFERENCE TO RELATED APPLICATION

The present application claims priority to Korean Patent Application No. 10-2022-0006459, filed on Jan. 17, 2022, the entire contents of which is incorporated herein for all purposes by this reference.

BACKGROUND OF THE PRESENT DISCLOSURE

Field of the Present Disclosure

The present disclosure relates to a method and apparatus of processing an image, and a vehicle having the same, and more specifically, to a method and apparatus of processing an image, and a vehicle having the same that are configured for training a weak kernel of a deep learning model.

Description of Related Art

Autonomous driving is a technology that enables a vehicle system to perform vehicle operation on its own, without driver's partial or full intervention. To implement the autonomous driving, an algorithm which may control various situations or factors is required. Accordingly, autonomous driving employs a deep learning algorithm with an artificial neural network structure that mimics the human neural network structure which may analyze various features from a large amount of data by itself.

The accuracy of deep learning algorithms may be greatly affected by the surrounding environment of the vehicle. Accordingly, various techniques have been developed to increase the reliability of deep learning algorithms, but deep learning algorithms have a limitation in providing an accuracy higher than or equal to a certain level.

On the other hand, the conventional deep learning algorithm adopts a method of training a model as a whole by focusing to resolve only the current problem of the model. However, in the instant case, only the strength of the model may be continuously learned while the weaknesses of the model may be further weakened.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of processing an image, and a vehicle including the same which may perform training by focusing on weakness of a deep learning model.

The technical objectives of the present disclosure are not limited to the above, and other objectives may become apparent to those of ordinary skill in the art based on the following descriptions.

According to an aspect of the present disclosure, there is provided a method of processing an image, the method including: obtaining image information; inputting a ground truth; inputting the image information to an object recognition model to output recognition information including a position and a type of an object included in the image information; generating misrecognition data based on the output recognition information and the ground truth; generating a weak pattern map of the object recognition model by processing the misrecognition data; and classifying a weak database based on the weak pattern map and at least one piece of pre-stored image information.

The generating of the weak pattern map may include, generating a pattern map of a predetermined size of the misrecognition data based on at least one of a feature point contribution and an input/output sensitivity of the misrecognition data.

The classifying of the weak database may include determining a similarity based on the pre-stored image information and the weak pattern map, and classifying a weak database based on the determined similarity.

The classifying of the weak database may include, in response to the determined similarity being greater than a predetermined value, classifying the pre-stored image information into the weak database.

The object recognition model may a model trained based on a convolutional neural network (CNN).

The method may further include selecting a weak kernel of the object recognition model based on the object recognition model and the weak pattern map, wherein the selected weak kernel is trained based on the weak database.

The selecting of the weak kernel may include: determining a sensitivity to the weak pattern map for each kernel of the object recognition model, and selecting, as a weak kernel, a kernel of which the sensitivity is determined as being greater than or equal to a predetermined sensitivity.

The training based on the weak database may include randomly classifying the weak database into a first weak database and a second weak database at a predetermined ratio, and training the weak kernel based on the first weak database.

The training of the weak kernel may include determining a performance level of the object recognition model based on the second weak database for each epoch of the training, wherein when the determined performance level is higher than a predetermined value, the training of the weak kernel is stopped.

According to another aspect of the present disclosure, there is provided an apparatus of processing an image, the apparatus including: an image sensor configured to obtain image information; an inputter configured to input a ground truth; and a controller connected to the image sensor and the inputter and including a processor configured to process the obtained image information, wherein the controller is configured to: input the image information to an object recognition model to output recognition information including a position and a type of an object included in the image information; generate misrecognition data based on the output recognition information and the ground truth; and generate a weak pattern map of the object recognition model by processing the misrecognition data; and classify a weak database based on the weak pattern map and at least one piece of pre-stored image information.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 9 is a flowchart for describing a weak kernel training operation of a image processing method according to an exemplary embodiment of the present disclosure; and FIG. 10 is a flowchart for describing an image processing method according to an exemplary embodiment of the present disclosure.

Figure 1:
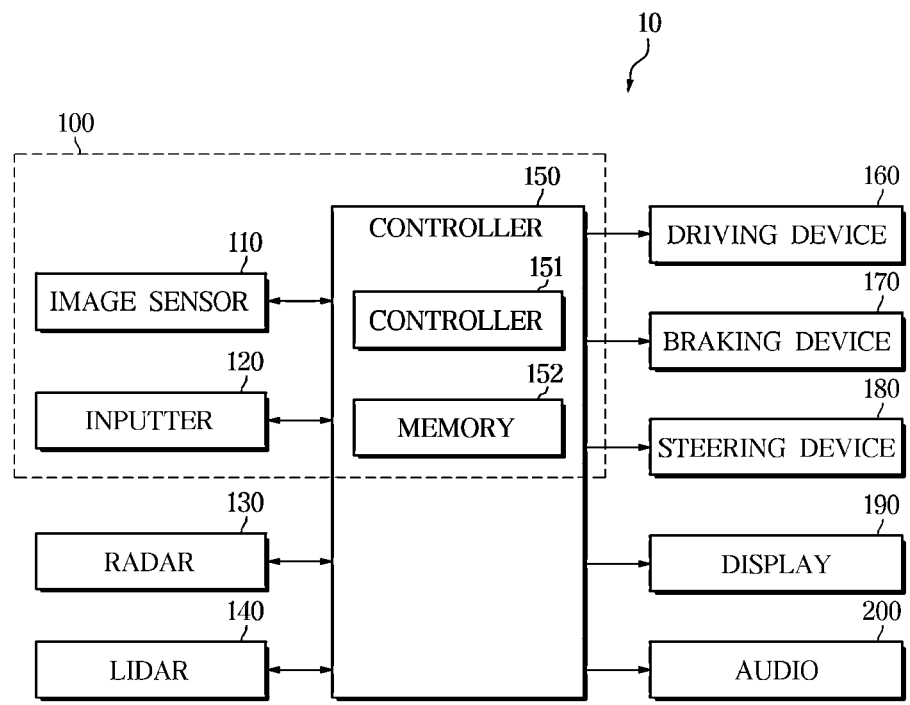
FIG. 1 is a block diagram illustrating a configuration of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like numerals refer to like elements throughout the specification. Not all elements of embodiments of the present disclosure will be described, and description of what are commonly known in the art or what overlap each other in the exemplary embodiments will be omitted. The terms such as "~part", "~module", "~member", "~block" or the like may be implemented in software or hardware, and according to various exemplary embodiments of the present disclosure, a plurality of "~parts", a plurality of "~modules", a plurality of "~members", a plurality of "~blocks" or the like may be implemented as one component, or may include a plurality of components.

It will be further understood that the term "connect" or its derivatives refer both to direct and indirect connection, and the indirect connection includes a connection over a wireless communication network.

It will be further understood that the terms "comprises" and/or "comprising," when used in the present specification, specify the presence of stated features, integers, operations, operations, elements, and/or components, but do not preclude the presence or addition of one or more other features, integers, operations, operations, elements, components, and/or groups thereof, unless the context clearly indicates otherwise.

Although the terms "first," "second," "A," "B," etc. may be used to describe various components, the terms do not limit the corresponding components, but are used only for distinguishing one component from another component.

A singular expression includes plural expression unless the context clearly dictates otherwise.

Reference numerals used for method operations are just used for convenience of explanation, but not to limit an order of the operations. Thus, unless the context clearly dictates otherwise, the written order may be practiced otherwise.

Autonomous driving is a technology that enables a vehicle system to perform vehicle operation on its own, without drive's partial or full intervention. To implement the autonomous driving, an algorithm which may control various situations or factors is required. Accordingly, autonomous driving employs a deep learning algorithm with an artificial neural network structure that mimics the human neural network structure which may analyze various features from a large amount of data by itself.

The accuracy of deep learning algorithms may be greatly affected by the surrounding environment of the vehicle. Accordingly, various techniques have been developed to increase the reliability of deep learning algorithms, but deep learning algorithms have a limitation in providing an accuracy higher than or equal to a certain level.

On the other hand, the conventional deep learning algorithm adopts a method of training a model as a whole by focusing to resolve only the current problem of the model. However, in the instant case, only the strength of the model may be continuously learned while the weaknesses of the model may be further weakened.

Furthermore, the conventional deep learning algorithm continues training without describing the model itself and its operation, which may increase uncertainty in the actual road.

A method and apparatus of processing an image and a vehicle including the same according to an exemplary embodiment of the present application may be provided to solve the above-described limitations. However, the present disclosure is not limited thereto.

A vehicle 10 according to an exemplary embodiment of the present disclosure refers to a transportation device that can travel on a road or track. Hereinafter, for the sake of convenience of description, the vehicle 10 will be illustrated as a four-wheeled vehicle. However, the exemplary embodiment of the vehicle 10 is not limited thereto.

The vehicle 10 may include a body including an exterior of the vehicle 10 and a frame of the vehicle 10 carrying people and/or cargo (for example, an engine compartment, a trunk, a bumper, a roof, a flank, a floor, etc.,) and a chassis including devices required for the vehicle 10 to travel, for example, an engine, a power transmission device, a steering device, a brake, and the like.

Meanwhile, general descriptions of the body and chassis of the vehicle 1 will be omitted.

Hereinafter, the operating principles and embodiments of the present disclosure will be described with reference to the accompanying drawings.

FIG. 1 is a block diagram illustrating a configuration of the vehicle 10 according to the exemplary embodiment of the present disclosure. Hereinafter, the vehicle 10 and an image processing apparatus 100 included therein according to the exemplary embodiment of the present disclosure will be described in brief, and then an image processing method will be described in detail.

Referring to FIG. 1, the vehicle 10 may include the image processing apparatus 100 including an image sensor 110, an inputter 120, and a controller 150, and include a radar 130, a Light Detection and Ranging (LiDAR) 140, a driving device 160, a braking device 170, a steering device 180, a display 190, and an audio 200. However, the present disclosure is not limited thereto. The vehicle 10 according to the exemplary embodiment of the present application may include at least one controller separately provided from the controller 150 included in the image processing apparatus 100 to perform overall control on the vehicle 10. That is, the vehicle 10 may include the controller 150 only for the image processing apparatus 100 and a separate controller configured for performing overall control of the vehicle 10.

The image sensor 110 may be disposed to face the surroundings of the vehicle 10 to have a field of view facing the surroundings of the vehicle 10. For example, the image sensor 110 may be provided on a front windshield of the vehicle 10, but the position of the image sensor 110 is not limited thereto.

The image sensor 110 may include a plurality of photodiodes that convert light into an electrical signal, and the plurality of photodiodes may be arranged in a two-dimensional matrix. The image sensor 110 may generate image information including a two-dimensional image, for example, and may generate image information including a plurality of two-dimensional images arranged over time.

The inputter 120 may receive various types of information from an external device and/or a server. The inputter 120 may receive a ground truth based on physical connection and/or wireless connection with an external device and/or a server. Here, the ground truth may refer to data including a position and/or a type of an object in image information. That is, from the point of view of machine learning, a ground truth may refer to data including a description of a result value and/or correct answer of data to be learned.

That is, the inputter 120 may obtain input data which is to be used when obtaining an output using training data for model training and a learning model. The inputter 120 may obtain raw input data, and in the instant case, the controller 150 may extract an input feature by preprocessing the input data.

The controller 150 may include a processor 151 and a memory 152.

The processor 151 may include at least one processor. For example, the processor may include a learning processor for machine learning and train a model including an artificial neural network using training data. Here, a trained artificial neural network may be referred to as a learning model. The learning model may be used to infer a result value with respect to new input data other than training data, and the inferred value may be used as a basis for determination to perform a certain operation.

In more detail, the processor 151 may include: an object recognition processor which may store an object recognition model for outputting recognition information including the position and type of an object based on image information being input; a misrecognition data generating processor that may, based on the recognition information output from the object recognition processor and a ground truth obtained through the inputter 120, generate misrecognition data; a weak pattern generating processor which may process the generated misrecognition data to generate a weak pattern of the object recognition model; a weak kernel selecting processor which may select a weak kernel of the object recognition model based on the generated weak pattern and the object recognition model; a weak database generating processor which may classify a weak database based on the weak pattern and at least one pre-stored image information; and a learning processor which may train the weak kernel based on the weak database and the weak kernel. However, the present disclosure is not limited thereto. That is, the number of processors is not limited thereto, and it should be understood that the number of processors described above may be less or more than the number of processors described above.

The memory 152 may store a program for performing the above-described operations and operations to be described below, and the processor 151 may execute the stored program. When the memory 152 and the processor 151 are provided in a plurality of units thereof, the plurality of memories 152 and the plurality of processors 151 may be integrated into one chip or may be provided in physically separate positions. The memory 152 may include a volatile memory, such as a static random access memory (S-RAM), a dynamic random access memory (D-RAM), and the like to temporarily memorize data. Furthermore, the memory 152 may include a nonvolatile memory device, such as a read only memory (ROM), an erasable programmable ROM (EPROM), an electrically erasable programmable ROM (EEPROM), and the like to store a control program and control data for a long time period. The processor 151 may include various logic circuits and arithmetic circuits, process data according to a program provided from the memory 152, and generate a control signal according to a result of processing.

The memory 152 may store data, training data, pre-stored image information, a learning history, and the like that are obtained from the image sensor 110 and/or the inputter 120.

Accordingly, the processor 151 may receive the image information obtained from the image sensor 110 and the ground truth obtained from the inputter 120, and may perform training on the object recognition model based on the image information and the ground truth.

Hereinafter, an image processing method according to an exemplary embodiment of the present application will be described with reference to FIGS. 2 to 10. FIGS. 2 to 10 illustrate operations performed by the image processing apparatus 100, which is described above, including the image sensor 110, the inputter 120, and the controller 150, or by the vehicle 10 including the image processing apparatus 100. Accordingly, the description of the image processing method described below may be equally applied to the description of the image processing apparatus 100 and/or the vehicle 10.

A deep learning algorithm is one of machine learning algorithms and refers to a modeling technique developed from an artificial neural network (ANN) that mimics a human neural network. The ANN may be configured in a multi-layered hierarchical structure.

An ANN may be provided in a hierarchical structure including an input layer, an output layer, and at least one intermediate layer (or a hidden layer) (e.g., a kernel) between the input layer and the output layer. The deep learning algorithm may, based on such a multi-layer structure, perform learning to optimize the weight of an interlayer activation function, to derive reliable results.

The image processing method according to the exemplary embodiment of the present application may be a method for training an object recognition model that recognizes an object based on image information of nearby areas of the vehicle 10. Here, the object relates to an object included in the image information, and may include, for example, a pedestrian and/or a vehicle and/or a cyclist. However, the type of object is not limited thereto.

The image processing method according to the exemplary embodiment of the present application may adopt a deep learning algorithm, for example, a convolutional neural network (CNN). However, the present disclosure is not limited thereto, and may adopt other types of deep learning algorithms according to various exemplary embodiments of the present disclosure.

CNN is characterized with a structure of extracting characteristics of data and identifying a pattern of the characteristics, unlike the existing technique in which a learning process is performed by extracting knowledge from data. The CNN may be performed through a convolution process and a pooling process. In other words, the CNN may include an algorithm in which a convolutional layer and a pooling layer are provided in combination. Here, in the convolution layer, a process (e.g., a convolution process) of extracting characteristics of data is performed. The convolution process is a process of investigating adjacent components of each component in data to identify characteristics, and deriving the identified characteristics as a single sheet, and in such a compression process, the number of parameters may be effectively reduced. In the pooling layer, a process (e.g., a pooling process) for reducing the size of a layer that has passed through the convolution process is performed. The pooling process may reduce the size of data, cancel noise, and provide detailed parts with consistency. For example, CNN may be used in various fields, such as information extraction, sentence classification, face recognition, and the like. Meanwhile, CNN is a well-known technology, and detailed descriptions thereof will be omitted below.

Figure 2:
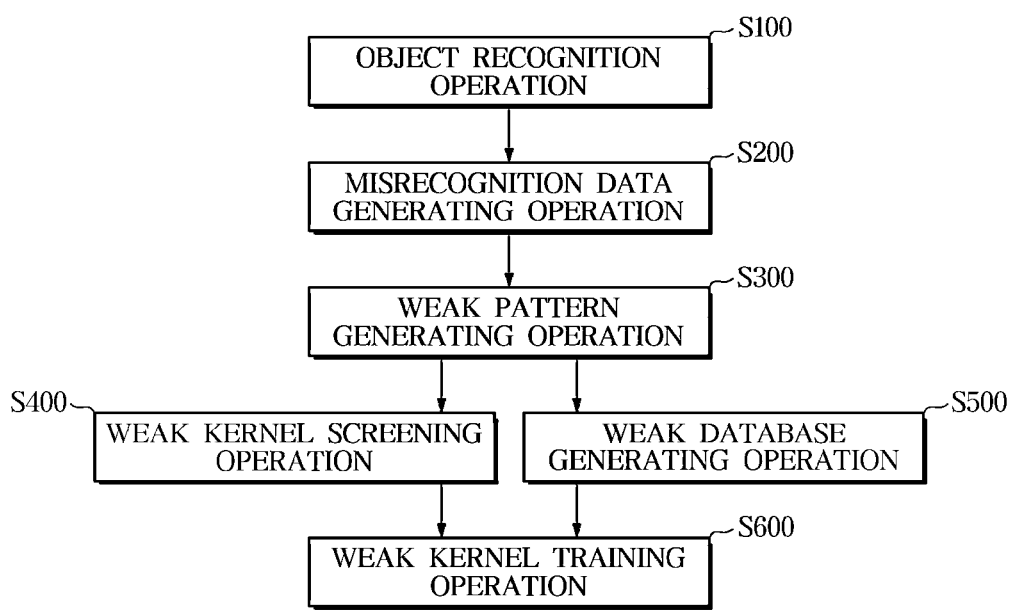
FIG. 2 is a flowchart for describing an image processing method according to an exemplary embodiment of the present disclosure.

FIG. 2 is a flowchart for describing an image processing method according to an exemplary embodiment of the present disclosure.

Referring to FIG. 2, the image processing method according to the exemplary embodiment of the present application may include an object recognizing operation (S100), a misrecognition data generating operation (S200), a weak pattern generating operation (S300), a weak kernel screening operation (S400), a weak database generating operation (S500) and a weak kernel training operation (S600).

In the object recognizing operation (S100), the image processing apparatus 100 inputs image information obtained by the image sensor 110 to an object recognition model to output recognition information including the position and type of an object included in the image information.

Here, the object recognition model may be an artificial intelligence model which is trained to receive image information, recognize the position and type of an object included in the image information, and output recognition information including a bounding box including the position and type of the object. The object recognition model may be a model trained through a CNN algorithm.

That is, the object recognition model receives image information and outputs information including the position and type of an object in the image information in a form of a two-dimensional bounding box, and but may also use an algorithm for recognizing the position and information of an object in other forms, such as semantic segmentation and cylinders, so that the form of recognition may vary. That is, the form of output recognition information including the position and type of the object is not limited, and it may be understood that conventionally known object recognition models and/or object recognition models to be developed in the future may be applied.

Meanwhile, in the object recognizing operation (S100), the image processing apparatus 100 may input image information, which is input through the inputter 120, rather than image information obtained by the image sensor 110, into the object recognition model, and output recognition information including the position and type of an object included in the image information. That is, according to an exemplary embodiment of the present disclosure, the image processing apparatus 100 may include the inputter 120 and the controller 150 without including the image sensor 110. However, the present disclosure is not limited thereto.

Figure 3:
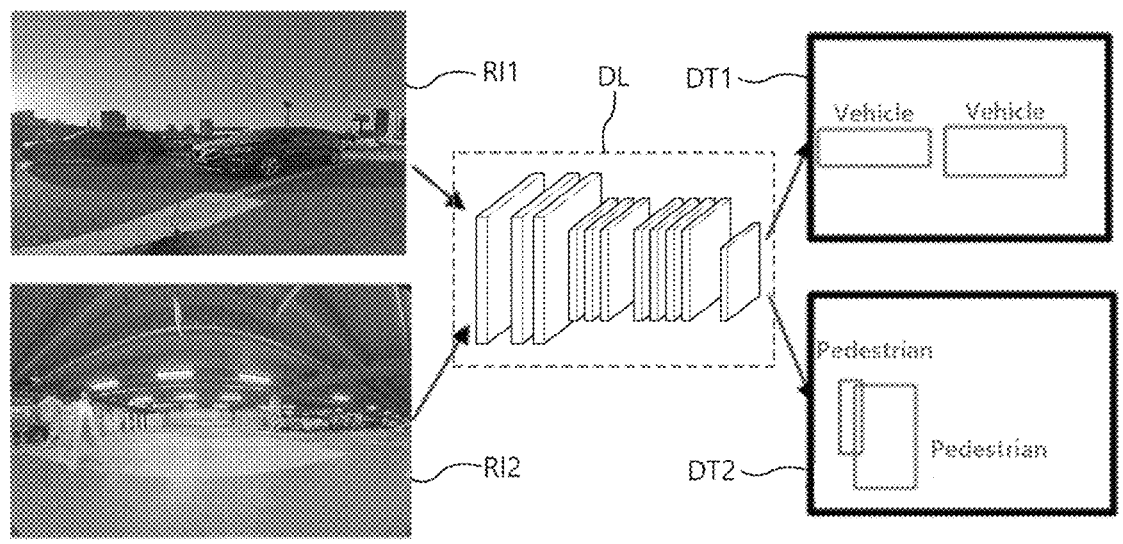
FIG. 3 is a diagram for describing an object recognizing operation of an image processing method according to an exemplary embodiment of the present disclosure.

FIG. 3 is a diagram for describing an object recognizing operation of an image processing method according to an exemplary embodiment of the present disclosure.

Referring to FIG. 3, in the object recognizing operation (S100), the image processing apparatus 100 may input image information RI1, RI2, and so on obtained by the image sensor 110 to an object recognition model DL to output recognition information DT1, DT2, . . . and so on including the type and position of an object. That is, the object recognition model DL may, based on image information being input in a form of a raw data, output recognition information DT1, DT2 . . . and so on including a shape of a bounding box. Accordingly, the image processing apparatus 100 may, based on the image information RI1, RI2, and so on, obtained by the image sensor 110, being processed, identify an object included in the image information RI1, RI2, and so on.

Furthermore, in the object recognizing operation (S100), the image processing apparatus 100 may transmit, to the memory 152, the image information RI1, RI2 . . . and so on obtained by the image sensor 110 and the recognition information DT1, DT2 . . . and so on output through the object recognition model. Accordingly, the memory 152 may receive the image information RI1, RI2 . . . and the like corresponding to raw data, which is obtained by the image sensor 110, and the recognition information DT1, DT2 . . . and so on, which is output from the object recognition model DL, in a wireless and/or wired manner and store the received information therein.

Meanwhile, the memory 152 may synthesize the image information RI1, RI2 . . . and so on with the recognition information DT1, DT2 . . . and so on corresponding thereto and store the synthesized information. That is, first image information RI1 may be synthesized with first recognition information DT1 output from the object recognition model DL corresponding thereto into one image, to display an object recognized by the object recognition model DL together with the image information.

Figure 4:
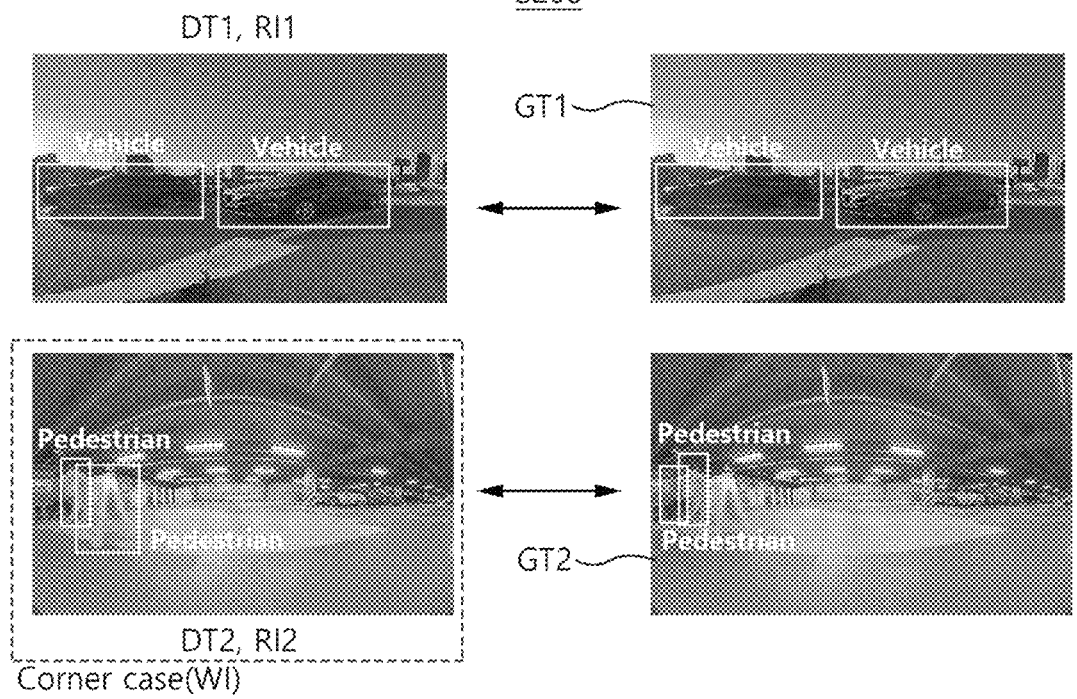
FIG. 4 is a diagram for describing a misrecognition data generating operation of an image processing method according to an exemplary embodiment of the present disclosure.

FIG. 4 is a diagram for describing a misrecognition data generating operation of an image processing method according to an exemplary embodiment of the present disclosure.

Referring to FIG. 4, in the misrecognition data generating operation S200, the image processing apparatus 100 may generate misrecognition data WI based on the recognition information DT of the object recognition module DL output in the object recognizing operation S100 and the ground truth.

In the misrecognition data generating operation S200, the image processing apparatus 100 may compare the synthesis image of the image information RI and the recognition information DT generated in the object recognizing operation S100 with ground truth GT1, GT2 . . . and so on received from the inputter 120 to determine misrecognition of the object recognition model. For example, the inputter 120 may use a labeling tool having been used when the deep learning model is initially trained from the user, to obtain a ground truth including recognition information DT corresponding to image information RI.

Accordingly, in the misrecognition data generating operation S200, the image processing apparatus 100 may classify misrecognition data (Corner case) WI based on the ground truth GT obtained through the inputter 120, and the image information RI obtained by the image sensor 110 and the recognition information DT output by the object recognition model DL based on the image information RI being input in the object recognizing operation S100.

In more detail, as shown in FIG. 4, referring to second image information RI2 and second recognition information DT2, it may be seen that, in the object recognizing operation S100, the image processing apparatus 100 recognizes an obstacle (a warning plate) as a pedestrian. However, a ground truth GT2 includes labeling data for two pedestrians without including labeling data for a warning plate (an obstacle). According to a comparison between the ground truth GT and the recognition information DT corresponding to the image information RI, the image processing apparatus 100 may classify (generate) misrecognition data (Corner case) WI.

That is, when at least one of the position and/or type of an object in the recognition information DT output from the object recognition model DL is different from that of the ground truth GT, the image processing apparatus 100 may classify the corresponding image information RI as misrecognition data WI.

Meanwhile, it should be understood that a pre-trained misrecognition data classification model and/or a misrecognition data classification model to be developed in the future may be applied to the image processing apparatus 100 when classifying misrecognition data WI. For example, the image processing apparatus 100 may adopt a Mean Intersection over Union (mIOU) algorithm for outputting misrecognition data WI based on recognition information DT output by the object recognition model DL, image information RI, and ground truth GT being input. However, the present disclosure is not limited thereto, and others algorithms suitable for outputting misrecognition data WI may be applied to the misrecognition data classification model.

Accordingly, in the misrecognition data generating operation S200, the image processing apparatus 100 may generate the misrecognition data WI in which the recognition information DT output from the object recognition model DL is different from the ground truth. That is, the misrecognition data WI may refer to input image information RI for which the object recognition model DL outputs recognition information DT different from the ground truth.

Figure 5:
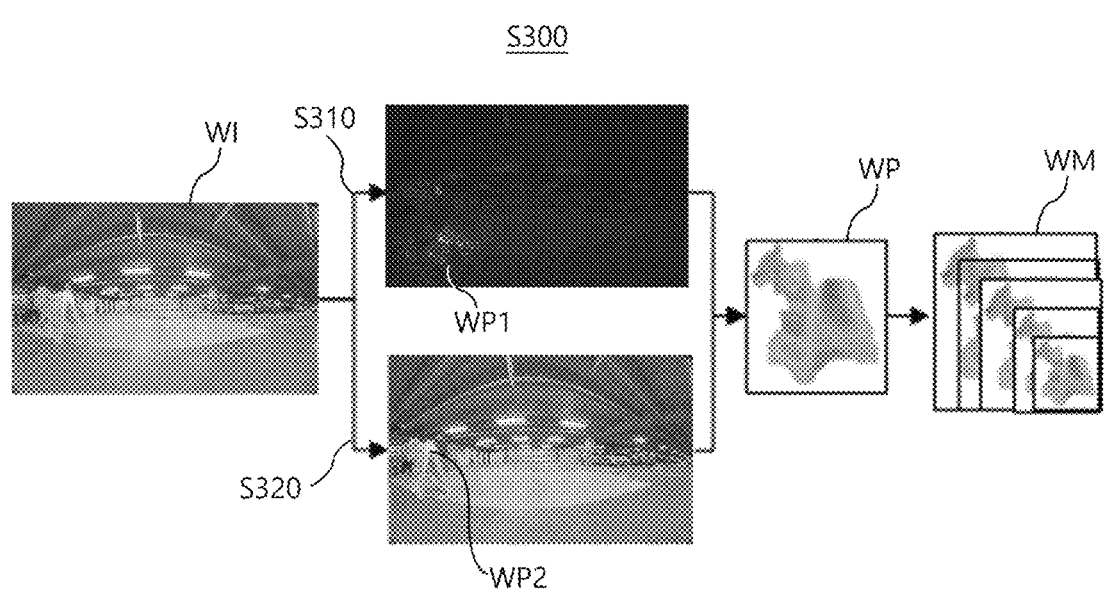
FIG. 5 is a diagram for describing a weak pattern generating operation of an image processing method according to an exemplary embodiment of the present disclosure.

FIG. 5 is a diagram for describing a weak pattern generating operation of an image processing method according to an exemplary embodiment of the present disclosure.

Referring to FIG. 5, in the weak pattern generating operation S300, the image processing apparatus 100 may, based on the misrecognition data WI being processed, generate a weak pattern map of the object recognition model DL. Here, the weak pattern map may refer to at least a portion of image information of the misrecognition data for which a mismatch occurs between recognition information DT output by the object recognition model DL and the ground truth GT. However, the present disclosure is not limited thereto.

The weak pattern generating operation S300 may include an operation of extracting a feature point contribution (S310) and an operation of extracting input/output sensitivity (S320). Accordingly, in the weak pattern generating operation S300, the image processing apparatus 100 may determine a first weak pattern WP1 including a region of the misrecognition data WI in which a feature point contribution is high and a second weak pattern WP2 including a region of the misrecognition data WI in which an input/output sensitivity is high, and generate a third weak pattern WP of an overlapping region based on processing of the first and second weak patterns WP1 and WP2. That is, the weak pattern WP may be generated based on at least one of a high feature point contribution and a high input/output sensitivity of the misrecognition data WI.

Accordingly, the image processing apparatus 100 may generate a weak pattern map WM that combines the weak patterns WP of various scales in a channel direction through scaling of the weak pattern WP. However, the present disclosure is not limited thereto.

In another exemplary embodiment of the present disclosure, in the weak pattern generating operation S300, the image processing apparatus 100 may generate the weak pattern map WM based only on the feature point contribution extracting operation S310, or based only on the input/output contribution extracting operation S320. As described above, the weak pattern map WM may be generated from a weak pattern WP synthesized based on an overlapping region of the first weak pattern WP1 generated through the feature point contribution extracting operation S310 and the second weak pattern WP2 generated through the input/output contribution extracting operation S320.

Meanwhile, for the sake of convenience of description, the misrecognition data WI is considered as a single image information RI. However, the present disclosure is not limited thereto, and it should be understood that the misrecognition data WI may include at least two pieces of image information generated in the misrecognition data generating operation S200, and each of the at least two pieces of image information may be subject to the weak pattern generating operation S300.

In the feature point contribution extracting operation S310, the image processing apparatus 100 may determine an object recognition model-inside feature point contribution of the image information included in the misrecognition data WI based on the misrecognition data WI being processed, to thereby extract the feature point contribution of the misrecognition data WI.

In the feature point contribution extracting operation S310, the image processing apparatus 100 may, based on the misrecognition data WI being input, determine an activation function of a feature map generated by the convolution layer of the object recognition model DL in a forward propagation, and then determine back propagation for the corresponding layer, to output a gradient.

Accordingly, the image processing apparatus 100 may multiply the determined gradient by the activation function and determine the average, to determine contribution of each feature point position to the output. In the feature point contribution extracting operation S310, the image processing apparatus 100 may derive the feature point contribution corresponding to each pixel position of the input misrecognition data WI based on Equation 1 below.

$$L(i,j) = ReLU\left(\sum_k a_k^c f_k(i,j)\right), a_k^c = \frac{1}{Z}\sum_i \sum_j \frac{\partial S^c}{\partial f_k(i,j)} \quad \text{[Equation 1]}$$

Here, L(i, j) denotes a feature point contribution corresponding to pixel coordinates (i, j), $f_R$ denotes an activation function, Z denotes the number of pixels of the misrecognition data WI, $S^c$ denotes an output score value, and ReLU may refer to a rectified linear unit (Relu) function.

Accordingly, in the feature point contribution extracting operation S310, the image processing apparatus 100 may extract the feature point contribution corresponding to each pixel from the misrecognition data WI. Here, it should be understood that coordinates including a high feature point contribution are coordinates greatly contributing to misrecognition.

Referring to FIG. 5, in the feature point contribution extracting operation S310, the image processing apparatus 100 may, based on the misrecognition data WI being input, generate a feature point contribution map corresponding to coordinates of the misrecognition data WI. Accordingly, the image processing apparatus 100 may identify coordinates including a feature point contribution higher than a predetermined value based on the feature point contribution map. In the instant case, the image processing apparatus 100 may determine the first weak pattern WP1 based on coordinates including a high feature point contribution. Here, it should be understood that the predetermined value may be set according to an experimentally and/or empirically set value, and/or the width of the first weak pattern WP1 desired by the user. When a wider weak pattern is desired, the user may set the predetermined value to be lower than the set value. However, the present disclosure is not limited thereto.

Meanwhile, in the feature point contribution extracting operation S310, the algorithm for the image processing apparatus 100 to determine the first weak pattern WP1 is not limited to the above. That is, the applicable technology is not limited, and conventionally developed technologies (e.g., GRAD-CAM++, SHAP, SCORECAM and so on) for interpreting an input/output relation or a feature map of the object recognition model DL and other technologies to be developed in the future may be applied.

Meanwhile, in the input/output sensitivity extracting operation S320, the image processing apparatus 100 may determine the input/output sensitivity of the misrecognition data WI based on the misrecognition data WI being processed.

In the input/output sensitivity extracting operation S320, the image processing apparatus 100 may, based on the misrecognition data WI being input, divide the inputted misrecognition data WI into super pixels. Here, a super pixel may refer to a group of at least one pixel classified as being perceptually meaningful among pixels included in the misrecognition data WI.

Here, the image processing apparatus 100 may group the misrecognition data WI into super pixels by applying the existing algorithms and algorithms to be developed in the future. For example, by applying the Felzenwalb & Huttenlocher algorithm, the image processing apparatus 100 may classify the misrecognition data WI into at least one super pixel.

Accordingly, in the input/output sensitivity extracting operation S320, the image processing apparatus 100 may use the classified at least one super pixel as an input to the network of the object recognition mode to perform determination in a forward propagation to output a result, and compare the amount of change relative to the existing result. That is, in a case of division into a plurality of super pixels, the amount of change compared to the existing result corresponding to each of the super pixels may be determined.

Accordingly, in the input/output sensitivity extracting operation S320, the image processing apparatus 100 may identify the amount of change corresponding to each super pixel as the input/output sensitivity. The image processing apparatus 100 may identify a region corresponding to a super pixel, in which the amount of change corresponding to the super pixels is higher than a predetermined value, as the second weak pattern WP2. However, the present disclosure is not limited thereto, and in another exemplary embodiment of the present disclosure, the image processing apparatus 100 may identify at least two super pixels including the highest amount of change among the amounts of change corresponding to the super pixels, and identify regions corresponding to the identified at least two super pixels as the second weak pattern WP2.

Meanwhile, in the input/output sensitivity extracting operation S320, the algorithm for the image processing apparatus 100 to determine the second weak pattern WP2 is not limited to the above. That is, the applicable technology is not limited, and conventionally developed technologies (e.g., GRAD-CAM++, SHAP, SCORECAM, and so on) for interpreting an input/output relation or a feature map of the object recognition model DL and other technologies to be developed in the future may be applied.

In summary, in the weak pattern generating operation S300, the image processing apparatus 100 may, based on the feature point contribution map generated using the misrecognition data WI as an input, identify a feature point contribution higher than a predetermined value, and identify the first weak pattern WP1 based on the high feature point contribution. In the instant case, the image processing apparatus 100 may generate the weak pattern map WM by scaling the first weak pattern WP1 according to a preset area.

Furthermore, in the weak pattern generating operation (S300), the image processing apparatus 100 may, based on the feature point contribution map generated using the misrecognition data WI as an input, classify the pixel coordinates included in the misrecognition data WI into super pixels, in which the super pixels are used as an input to perform determination by forward propagation to output the amount of change compared to the existing result, and in the order of the greatest amount of change, at least one super pixel may be identified and a region of the identified super pixel may be identified as the second weak pattern WP2. In the instant case, the image processing apparatus 100 may generate the weak pattern map WM by scaling the second weak pattern WP2 according to a preset area.

On the other hand, the image processing apparatus 100 may synthesize the first weak pattern WP1 obtained through the feature point contribution extracting operation S310 and the second weak pattern WP2 obtained through the input/output sensitivity extracting operation S320 to generate the weak pattern WP. In more detail, in the weak pattern generating operation S300, the image processing apparatus 100 generates a weak pattern WP for an overlapping region of the first weak pattern WP1 and the second weak pattern WP2, and based on the weak pattern WP, scale the weak pattern WP according to a preset area to generate a weak pattern map WM. However, the present disclosure is not limited thereto.

That is, in the weak pattern generating operation S300, the image processing apparatus 100 may generate the weak pattern map WM using the misrecognition data WI obtained in the misrecognition data generating operation S200 as an input. Accordingly, the weak pattern map WM generated thereby may be provided so that a user may recognize a problem with the current model.

Figure 6:
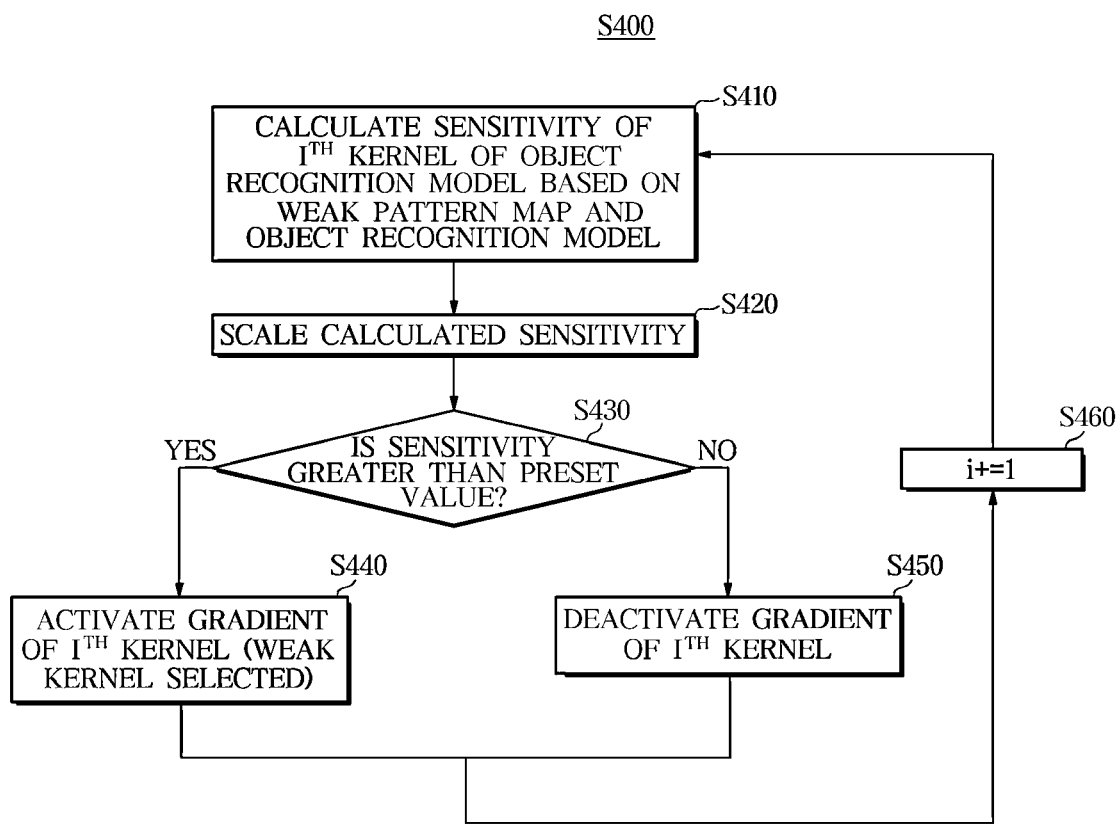
FIG. 6 is a flowchart for describing a weak kernel selecting operation of an image processing method according to an exemplary embodiment of the present disclosure.

FIG. 6 is a flowchart for describing a weak kernel screening operation of an image processing method according to an exemplary embodiment of the present disclosure.

Referring to FIG. 6, the weak kernel screening operation S400 may include an operation of determining the sensitivity of an $i^{th}$ kernel of the object recognition model DL based on the weak pattern map WM and the object recognition model DL (S410), an operation of scaling the determined sensitivity (S420), an operation of determining whether the scaled sensitivity is greater than a predetermined value (S430), an operation of activating the gradient of the $i^{th}$ kernel in response to the scaled sensitivity being greater than the predetermined value (S440), and an operation of deactivating the gradient of the $i^{th}$ kernel in response to the scaled sensitivity being smaller than the predetermined value (S450), and an operation of iteratively performing the operation S410 to determine the sensitivity of an i+1$^{th}$ kernel after the activating operation S440 or the deactivating operation S450 (S460).

Each kernel or filter of the convolution layer of the object recognition model DL is activated for a specific pattern on the input image information to recognize an object of the image information. That is, there are kernels that are activated to a specific pattern, and when training is performed only on weak kernels, information of the existing well-trained kernels may be preserved, resulting in a remarkable effect. Furthermore, as the number of kernels to be trained is reduced, the number of learning parameters may be reduced, and thus costs (e.g., computing power, time, etc.) required for the training may be reduced. Furthermore, against factors of the existing learning algorithm which may further weaken the weakness, the misrecognition data (Corner case) (WI) may be more significantly reduced.

In the sensitivity determination operation S410, the image processing apparatus 100 may determine the sensitivity of the $i^{th}$ kernel based on the weak pattern map WM obtained in the weak pattern generating operation S300. In the sensitivity determination operation S410, the image processing apparatus 100 may determine the sensitivity of the $i^{th}$ kernel based on Equation 2 below.

$$\eta_i = \sqrt{1/N_t \sum_j \text{abs}\left(\frac{\partial y_j}{\partial \theta_i}\right)} \quad \text{[Equation 2]}$$

Here, $\eta^i$ denotes the sensitivity of the $i^{th}$ kernel, $N_t$ denotes the number of weak pattern maps WM, abs denotes an absolute value operator, $\theta_i$ denotes an $i^{th}$ kernel, and $y_j$ denotes a $j^{th}$ weak pattern map.

Accordingly, in the sensitivity determination operation S410, the image processing apparatus 100 may use the weak pattern map WM generated in the weak pattern generating operation S300 and an $i^{th}$ kernel of the object recognition model DL as an input, to determine the sensitivity of the i kernel.

In the scaling operation S420, the image processing apparatus 100 may perform scaling on the determined sensitivity of the $i^{th}$ kernel. For example, the image processing apparatus 100 may scale the sensitivity of the $i^{th}$ kernel from 0 to 1. That is, the image processing apparatus 100 may scale the maximum sensitivity to 1 and the minimum sensitivity to 0, to identify a weak kernel based on the scaled sensitivity.

Accordingly, in the determining operation S430, the image processing apparatus 100 may perform comparison with a predetermined value based on the scaled sensitivity. Here, the predetermined value is a value set empirically and/or experimentally, and when the predetermined value is high, the cost (e.g., computing power, time, etc.) may be reduced, and when the predetermined value is low, the reliability of model training may be increased. For example, the predetermined value may be set to 0.5.

In the gradient activating operation S440, the image processing apparatus 100 may, in response to the sensitivity of the $i^{th}$ kernel being greater than the predetermined value, activate the gradient for training.

Furthermore, in the gradient deactivating operation S450, the image processing apparatus 100 may, in response to the sensitivity of the $i^{th}$ kernel being less than the predetermined value, deactivate the gradient for training. That is, the gradient may be determined as 0.

In summary, in the gradient activating operation S440 and the gradient deactivating operation S450, the image processing apparatus 100 may determine the gradient for the $i^{th}$ kernel based on Equation 3 below.

$$\frac{\partial L}{\partial \theta} = \begin{cases} \frac{\partial L}{\partial \theta}, & \eta_i > \gamma \\ 0, & \eta_i < \gamma \end{cases} \quad \text{[Equation 3]}$$

Here, $$\frac{\partial L}{\partial \theta}$$

denotes a parameter gradient during training, r denote a predetermined value, and $\eta_i$ denotes the sensitivity of the $i^{th}$ kernel.

Accordingly, in the weak kernel screening operation S400, the image processing apparatus 100 may assign a different gradient (activation or deactivation) to the $i^{th}$ kernel, so that only the $i^{th}$ kernel assigned with a gradient may be subject to model training next time.

On the other hand, because there is a plurality of kernels of the object recognition model DL, in the iterative operation S460, the image processing apparatus 100 may determine a sensitivity with respect to the $i^{th}$ kernel, determine (determine the gradient) whether to activate or deactivate of a training gradient of the $i^{th}$ kernel based on the determined sensitivity, and return to the operation S410 to determine the sensitivity for the i+1$^{th}$ kernel, so that only weak kernels may be selected from all kernels included in the object recognition model DL. That is, the image processing apparatus 100 performs training on kernels for which a gradient is activated among the kernels of the object recognition model DL, and does not perform training on kernels for which a gradient is deactivated. However, the present disclosure is not limited thereto.

Figure 7:
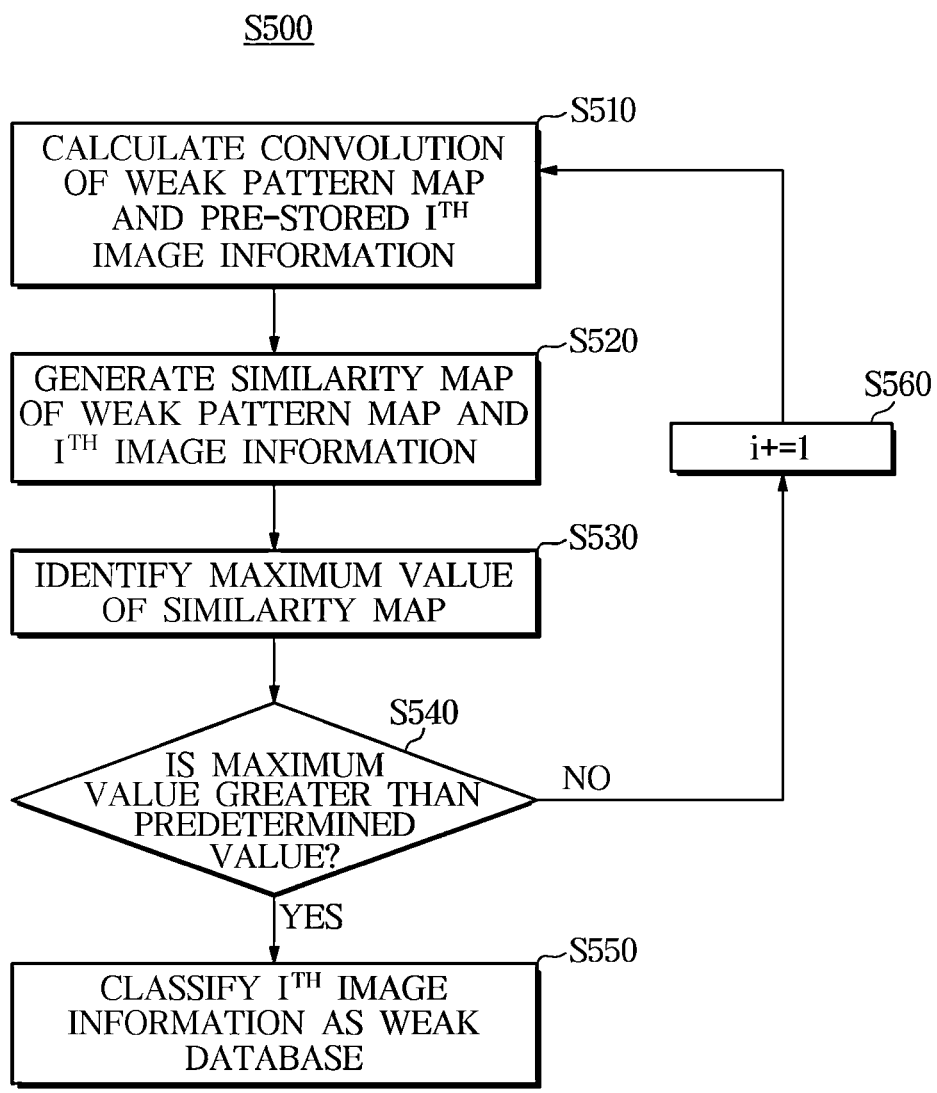
FIG. 7 is a flowchart for describing a weak database generating operation of an image processing method according to an exemplary embodiment of the present disclosure.

FIG. 7 is a flowchart for describing a weak database generating operation of an image processing method according to an exemplary embodiment of the present disclosure.

Referring to FIG. 7, the weak database generating operation S500 includes an operation of determining a convolution of a weak pattern map WM and pre-stored $i^{th}$ image information (S510), an operation of generating a similarity map of the weak pattern map WM and the $i^{th}$ image information (S520), an operation of identifying the maximum value of the similarity map (S530), an operation of determining whether the identified maximum value is greater than a predetermined value (S540), an operation of classifying the $i^{th}$ image information as a weak database in response to the identified maximum value being greater than the predetermined value (S550) and an operation of iteratively performing the operation S510 determining a convolution of the weak pattern map WM and pre-stored $i+1^{th}$ image information (S560).

That is, in the weak database generating operation S500, the image processing apparatus 100 may, based on the weak pattern map WM generated in the weak pattern generating operation S300 and pre-stored pieces of image information, classify (select) pieces of image information, which are weak to the object recognition model DL, among to the pieces of image information. That is, the image processing apparatus 100 may classify image information weak to the object recognition model DL among at least one piece of pre-stored image information, to generate a data set for training the object recognition model DL. However, the present disclosure is not limited thereto.

Meanwhile, the pre-stored image information may include image information obtained by the image sensor 110 and/or pre-stored image information. That is, it may be understood that previously stored image information may be utilized. For example, the pre-stored image information may include at least one piece of image information, and may include a plurality of pieces of image information.

In the convolution determining operation S510, the image processing apparatus 100 may perform a convolution operation on the $i^{th}$ image information, which is pre-stored image information, and the weak pattern map WM generated in the weak pattern generating operation S300.

Accordingly, in the similarity map generating operation S520, the image processing apparatus 100 may determine the channel-direction average of the convolution results determined in the convolution determining operation S510, so that a similarity map of the weak pattern map and the $i^{th}$ image information may be generated. That is, because absolute value convolution refers to cosine similarity, and the internal product has a property of providing a higher value with respect to a similar pattern, the similarity map generated by the image processing apparatus 100 provides a higher value when there is a similar pattern between the pre-stored image information and the weak pattern map WM. Accordingly, the similarity map may quantitatively identify the degree to which the at least one piece of pre-stored image information includes a pattern similar to that of the weak pattern map WM.

The image processing apparatus 100 may generate a similarity map of a weak pattern map WM and pre-stored $i^{th}$ image information based on Equation 4 below.

$$SM_i = \text{Mean}(\Sigma_c{}^C \Sigma_{k1} \Sigma_{k2} \text{sim}(wm_{m,n}{}^{ch}, IM_{l+m,j+n,c}), \text{ by channel of WM}) \quad \text{[Equation 4]}$$

Here, $SM_i$ denotes a similarity map between $i^{th}$ image information and the weak pattern map, $wm_{m,n}$ denotes a coordinate (m, n) value of the weak pattern map MW, $IM_{i+m,j+n,c}$ denotes an image input, sim denotes a cosine similarity, Mean denotes an average operator, C denotes an RGB channel, k1 denotes the size of the weak pattern map WM, and k2 denotes the size of an image.

That is, the image processing apparatus 100 may perform the convolution determining operation S510 and the similarity map generating operation S520 based on the pre-stored $i^{th}$ image information and the weak pattern map WM based on Equation 4 above.

Meanwhile, in the operation S530 of identifying the maximum value of the similarity map SM, the image processing apparatus 100 may identify the maximum value in the similarity map SMi generated in the similarity map generating operation S520. Accordingly, the image processing apparatus 100 may determine whether the maximum value of the similarity map SMi is greater than a predetermined value. That is, the image processing apparatus 100 determines whether the channel direction average value for each coordinate of the similarity map SMi generated using $i^{th}$ image information as an input in the similarity map generating operation S520 is greater than a predetermined value.

In the weak database classification operation S550, the image processing apparatus 100 may, when the maximum similarity value identified in the operation S530 of identifying the maximum value of the similarity map SMi is greater than the predetermined value, classify (generate) the $i^{th}$ image information used in the convolution determining operation S510 and the similarity map generating operation S520 as a weak database. That is, as described above, when the maximum value of the similarity map is great, it may represent that the similarity between the $i^{th}$ image information and the weak pattern map WM is high, which is a case of corresponding to weak data with high reliability.

Here, the predetermined value may be, for example, 0.7, but is not limited thereto. That is, the predetermined value may be set experimentally and/or empirically. On the other hand, as the predetermined value increases, the image processing apparatus 100 is provided to classify image information having a higher similarity with the similarity map SMi as a weak database. Accordingly, the amount of image information classified as weak databases tends to decrease. That is, the user may set the value experimentally and/or empirically to adjust the quantitative number of weak databases.

Meanwhile, in the iterative operation S560, the image processing apparatus 100 may, when the maximum similarity value identified in the operation S530 of identifying the maximum value of the similarity map SMi is smaller than the predetermined value, may iteratively perform the operation S510 of determining the convolution, the operation S520 of generating a similarity map, the operation S530 of identifying the maximum value, and the operation 540 of determining whether the identified maximum value is greater than a predetermined value on $i+1^{th}$ image information. Accordingly, the image processing apparatus 100 may classify the weak database with respect to all of the at least one pre-stored image information.

That is, in the iterative operation S560, the image processing apparatus 100 may perform a convolution operation and generate a similarity map for each of the pieces of pre-stored image information until the number of pieces of pre-stored image information is equal to i, so that all pieces of pre-stored image information may be classified.

Accordingly, in the weak database generating operation S500, the image processing apparatus 100 may generate (classify) the weak database based on the at least one piece of pre-stored image information and the weak pattern map WM.

Figure 8:
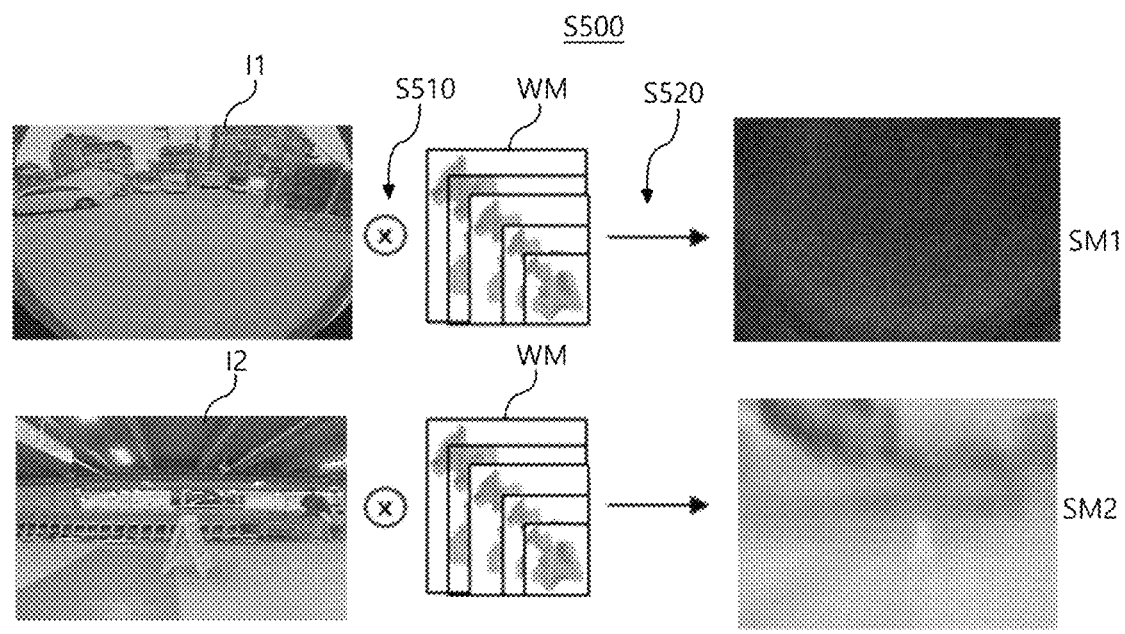
FIG. 8 is a conceptual diagram for describing a weak database generating operation of an image processing method according to an exemplary embodiment of the present disclosure.

FIG. 8 is a conceptual diagram for describing a weak database generating operation of an image processing method according to an exemplary embodiment of the present disclosure.

Referring to FIG. 8, in the weak database generating operation S500, the image processing apparatus 100 may generate similarity maps SM1 and SM2 based on pre-stored image information I1, I2 . . . and so on and the weak pattern map WM.

In the convolution determining operation S510 included in the weak database generating operation S500, the image processing apparatus 100 may determine the convolution of the pre-stored first image information I1 and the weak pattern map WM.

Accordingly, in the similarity map generating operation S520 included in the weak database generating operation S500, the image processing apparatus 100 may determine the channel-direction average of the results performed in the convolution determining operation S510, to thereby generating the similarity map SM1.

As shown in the drawings, because the first image information I1 does not have a pattern similar to the weak pattern map WM, it may be seen that the image processing apparatus 100 outputs the similarity map SM1, which has a small value as a whole, through the convolution determination operation S510 and the similarity map generating operation S520. Furthermore, because the second image information I2 includes a pattern similar to the weak pattern map WM in the center, it can be seen that the image processing apparatus 100 outputs the similarity map SM2, which has a high similarity value in the center portion of the second image information I2, through the convolution determination operation S510 and the similarity map generating operation S520.

Accordingly, referring to FIG. 8, in the weak database generating operation S500, the image processing apparatus 100 may identify the maximum value of the similarity map SM1 generated based on the first image information I1 and the maximum value of the similarity map SM2 generated based on the second image information I2, and in response to the identified maximum value being greater than a predetermined value, generate (classify) the corresponding image information as a weak database. For example, the maximum value of the similarity map SM1 generated based on the first image information I1 may be 0.3, and the maximum value of the similarity map SM2 generated based on the second image information I2 may be 0.8, and when the predetermined value is set to 0.8, the image processing apparatus 100 may classify (generate) the second image information I2 as a weak database.

FIG. 9 is a flowchart for describing a weak kernel training operation of an image processing method according to an exemplary embodiment of the present disclosure.

Referring to FIG. 9, in the weak kernel training operation S600, the image processing apparatus 100 may focus on training kernels of the object recognition model that are selected (e.g., the gradient activated or deactivated) in the weak kernel screening operation S400, based on the weak database obtained in the weak database generating operation S500.

The weak kernel training operation S600 may include a database random classification operation (S610), a weak kernel training operation (S620), a performance level determining operation (S630), an operation (S640) of determining whether the performance level determined in the performance level determining operation S630 is greater than a predetermined value, and an object recognition update model (S650).

In the database random classification operation S610, the image processing apparatus 100 may randomly classify the weak databases obtained in the weak database generating operation S500 into a first weak database and a second weak database at a predetermined ratio. Here, the first weak database may be an image information set which may be input as a dataset for training the weak kernels (or parameters) selected in the weak kernel screening operation S400), and the second weak database may be an image information set which may be input as a dataset for evaluating the object recognition model DL trained using the first weak database as an input. However, the present disclosure is not limited thereto. Here, the predetermined ratio may be a ratio which may be set experimentally and/or empirically, and may adopt a ratio of 9:1.

Thereafter, in the weak kernel training operation S620, the image processing apparatus 100 may train the weak kernels selected in the weak kernel screening operation S400 based on the first weak database classified in the database random classification operation S610. The image processing apparatus 100 may train the weak kernels based on the first weak database through gradient descent. That is, according to the training gradient applied to the kernel in the weak kernel screening operation S400, a kernel whose gradient is determined as 0 (deactivation) is not trained, and a kernel whose gradient is determined as activation is trained. Accordingly, the image processing apparatus 100 may preserve information of the existing well-trained kernel while selectively training only the weak kernel, so that an effect of reducing the computing power may be provided. However, the present disclosure is not limited thereto.

In another exemplary embodiment of the present disclosure, in the weak kernel training operation S620, the image processing apparatus 100 may determine a training gradient as 0 (deactivation) for kernels in a lower portion of the object recognition model DL, and may determine a training gradient as 1 (activation) for kernels in an upper portion of the object recognition model DL so that only the kernels of the upper portion of the object recognition model DL may be trained. This may apply under the assumption that the kernels of the lower portion of the object recognition model DL have a higher sensitivity than the kernels of the upper portion. However, the present disclosure is not limited thereto.

That is, in the weak kernel training operation S620, the image processing apparatus 100 does not only perform training on the weak kernels selected through the weak kernel screening operation S400, but may also perform training on kernels selected according to other conventional algorithms and/or algorithms to be developed in the future. In summary, the weak kernel training operation S620 may be an operation of training kernels selected through other types of kernel selecting operations.

Meanwhile, in the performance level determining operation S630, the image processing apparatus 100 may, based on the object recognition model DL trained through the above-described weak kernel training operation S620 and the second weak database classified through the database random classification operation S610, determine a performance level of the trained object recognition model DL.

In the performance determination operation S630, the image processing apparatus 100 may determine a performance level for recognition information DT output using the second weak database as an input for the object recognition model DL trained through the weak kernel training operation S620. Here, F1 Score may be used for the performance level. Because F1 Score is a general technique, detailed descriptions are omitted.

Accordingly, in the determining operation S640, the image processing apparatus 100 may determine whether the performance level determined in the performance level determining operation S630 is greater than a predetermined value. Here, the predetermined value may be an empirical and/or experimental value set for reliability and/or accuracy desired by a user.

In the object recognition model updating operation S650, the image processing apparatus 100 may, in response to the performance level determined in the performance level determination operation S630 being greater than the predetermined value, update the existing object recognition model with the object recognition model trained in the weak kernel training operation S620.

Meanwhile, the image processing apparatus 100 may, in response to the performance level determined in the performance level determination operation S630 being smaller than the predetermined value, repeatedly perform the weak kernel training operation S620 based on the first weak database. That is, in the weak kernel training operation S600, the image processing apparatus 100 may perform the performance evaluation for each epoch of weak kernel training, and when the determined performance level is not greater than the value preset by the user, perform re-training. However, the present disclosure is not limited thereto.

Accordingly, the above-described image processing method may provide an effect of specifying and reducing cases of misrecognition and/or non-recognition of the object recognition model.

As an example applicable to the present disclosure, the image processing apparatus 100 may be connected to an autonomous driving control device for controlling autonomous driving in the vehicle system, and may set and/or select a deep learning algorithm used by the autonomous driving control device and provide the deep learning algorithm to the autonomous driving control device.

The image processing apparatus 100 according to the present disclosure may operate according to various image processing methods described above.

Furthermore, the vehicle 10 according to the exemplary embodiment of the present disclosure may include the above-described image processing apparatus 100. Accordingly, the operations described with reference to the above-described image processing method may be performed by the vehicle 10.

At least one component may be added or omitted to correspond to the performances of the components of the vehicle 10 described above. Furthermore, the mutual positions of the components may be changed to correspond to the performance or structure of the system.

Some of the components of the vehicle 10 may refer to a software component and/or a hardware component, such as a Field Programmable Gate Array (FPGA) and an Application Specific Integrated Circuit (ASIC).

Meanwhile, the image processing method according to the exemplary embodiment of the present application is not limited to the above description.

The image processing method according to the exemplary embodiment of the present application may be performed by an image processing system. Meanwhile, the image processing system according to the exemplary embodiment of the present application will be described based on features that are differentiated from those of the method of processing descried above.

The image processing system according to an exemplary embodiment of the present application may include a vehicle 10 and an image processing apparatus 100. That is, the vehicle 10 and the image processing apparatus 100 may be provided separately.

The vehicle 10 may include an image sensor, a communicator, and a controller. Here, the controller may store an object recognition model which is configured to, based on image information received from the image sensor, output the type and position of an object included in the image information, so that in response to image information of a nearby area of the vehicle 10 being input, the controller may output the position and type of an object in the nearby area of the vehicle 10 based on the object recognition model. Here, the object recognition model may be an artificial intelligence model previously trained and stored in the memory of the controller.

Furthermore, the controller may output a control signal to transmit image information obtained from the image sensor to the image processing apparatus 100. The controller may output a control signal to transmit recognition information, which is output based on the image information obtained from the image sensor being input into the object recognition model, together with the image information to the image processing apparatus 100.

Meanwhile, the image processing apparatus 100 may include a controller and a communicator.

The communicator of the image processing apparatus 100 may receive the image information, which is obtained by the image sensor of the vehicle 10, and the recognition information of the object, which is included in the image information and output by the controller of the vehicle 10, through the communicator of the vehicle 10. Accordingly, the controller of the image processing apparatus 100 may store the received image information and object recognition information. Furthermore, the image processing apparatus 100 may store the same model as the object recognition model stored in the controller of the vehicle 10 in the memory.

Meanwhile, the image processing apparatus 100 may generate a signal for controlling the communicator to transmit update information, which includes a newly trained object recognition model, to the vehicle 10 to update the stored object recognition model.

FIG. 10 is a flowchart for describing an image processing method according to an exemplary embodiment of the present disclosure. In more detail, in FIG. 10, a flow chart of an image processing method performed by the image processing system according to an exemplary embodiment of the present disclosure is illustrated.

The image processing method performed by the image processing system may be applied in the same manner as the above described method and apparatus of processing an image and the vehicle having the same. However, it may be understood that the image processing method performed by the image processing system may adopt different agents for performing each operation of the method.

Referring to FIG. 10, the vehicle 10 may obtain image information (S710). Accordingly, the vehicle 10 may transmit the image information to the image processing apparatus 100.

Furthermore, the image processing apparatus 100 may input a ground truth (S720).

Furthermore, the vehicle 10 may input the image information into the object recognition model to output recognition information including the type and position of an object included in the image information (S730). Accordingly, the vehicle 10 may transmit the recognition information to the image processing apparatus 100.

Furthermore, the image processing apparatus 100 may generate misrecognition data based on the recognition information received from the vehicle 10 and the ground truth (S740).

Furthermore, the image processing apparatus 100 may generate a weak pattern map of the object recognition model based on the misrecognition data (S750).

Furthermore, the image processing apparatus 100 may classify weak databases based on the weak pattern map and at least one piece of pre-stored image information (S760).

Furthermore, the image processing apparatus 100 may select a weak kernel based on the weak pattern map and the object recognition model (S770).

Furthermore, the image processing apparatus 100 may train the selected kernel based on the weak database (S780). Accordingly, the image processing apparatus 100 may generate a signal for controlling the communicator to transmit update information including the object recognition model trained in operation S780 to the vehicle 10.

Furthermore, the vehicle 10 may update the existing object recognition model based on the update information received from the image processing apparatus 100 (S790).

Meanwhile, the disclosed exemplary embodiments of the present disclosure may be embodied in a form of a recording medium storing instructions executable by a computer. The instructions may be stored in a form of program code, and when executed by a processor, may generate a program module to perform the operations of the disclosed exemplary embodiments of the present disclosure. The recording medium may be embodied as a computer-readable recording medium.

The program may include code coded in a computer language, such as C, C++, Java, another machine language, etc., which may be read by a processor (e.g., a central processing unit (CPU)) of a computer through a device interface of the computer for the computer to read the program and execute the methods implemented as the program. The code may include functional code which is related to a function that defines functions needed to execute the methods and may include execution procedure-related control code needed to cause the processor of the computer to execute the functions according to a predetermined procedure. Furthermore, the code may further include memory reference-related code indicating a position (an address) of an internal or external memory of the computer where additional information or media needed to cause the processor of the computer to execute the functions should be referenced. Furthermore, when the processor of the computer needs to communicate with any other computer or server, etc. At a remote site, to perform the above-described functions, the code may further include communication-related code such as how to communicate with any other computer or server at a remote site and what information or media should be transmitted or received during communication.

The operations of the method or algorithm described in connection with the exemplary embodiment of the present disclosure may be implemented directly in hardware, implemented in a software module executed by hardware, or implemented in a combination thereof. Software modules may reside in a RAM, a ROM, an Erasable Programmable ROM (EPROM), an Electrically Erasable Programmable ROM (EEPROM), a flash memory, a hard disk, a removable disk, a CD-ROM, or any other form of computer-readable recording medium known in the art to which the present disclosure pertains.

As is apparent from the above, the method and apparatus of processing an image, and a vehicle having the same can perform training by focusing on the weaknesses of a deep learning model.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of processing an image, the method comprising:
    obtaining, by an image sensor, image information;
    inputting, by an inputter, a ground truth;
    inputting, by a controller operably connected to the image sensor and the inputter, the image information to an object recognition model to output recognition information including a position and a type of an object included in the image information;
    generating, by the controller, misrecognition data based on the output recognition information and the input ground truth;
    generating, by the controller, a weak pattern map of the object recognition model by processing the misrecognition data; and
    classifying a weak database based on the weak pattern map and at least one piece of pre-stored image information.

2. The method of claim 1, wherein the generating of the weak pattern map includes:
generating a pattern map of a predetermined size of the misrecognition data based on at least one of a feature point contribution and an input/output sensitivity of the misrecognition data.

3. The method of claim 1, wherein the classifying of the weak database includes:
determining a similarity based on the pre-stored image information and the weak pattern map, and classifying a weak database based on the determined similarity.

4. The method of claim 3, wherein the classifying of the weak database includes:
in response to the determined similarity being greater than a predetermined value, classifying the pre-stored image information into the weak database.

5. The method of claim 1, wherein the object recognition model is a model trained based on a convolutional neural network (CNN).

6. The method of claim 5, further including:
selecting, by the controller, a weak kernel of the object recognition model based on the object recognition model and the weak pattern map, wherein the selected weak kernel is trained based on the weak database.

7. The method of claim 6, wherein the selecting of the weak kernel includes:
determining a sensitivity to the weak pattern map for each kernel of the object recognition model, and
selecting, as the weak kernel, a kernel of which the sensitivity is determined as being greater than or equal to a predetermined sensitivity.

8. The method of claim 6, wherein the training based on the weak database includes:
randomly classifying the weak database into a first weak database and a second weak database at a predetermined ratio, and
training the weak kernel based on the first weak database.

9. The method of claim 8, wherein the training of the weak kernel includes:
determining a performance level of the object recognition model based on the second weak database for each epoch of the training,
wherein when the determined performance level is higher than a predetermined value, the training of the weak kernel is stopped.

10. An apparatus of processing an image, the apparatus comprising:
an image sensor configured to obtain image information;
an inputter configured to input a ground truth; and
a controller connected to the image sensor and the inputter and including a processor configured to process the obtained image information,
wherein the controller is further configured to:
input the image information to an object recognition model to output recognition information including a position and a type of an object included in the image information,
generate misrecognition data based on the output recognition information and the input ground truth,
generate a weak pattern map of the object recognition model by processing the misrecognition data, and
classify a weak database based on the weak pattern map and at least one piece of pre-stored image information.

11. The apparatus of claim 10, wherein the controller is further configured to generate a pattern map of a predetermined size of the misrecognition data based on at least one of a feature point contribution and an input/output sensitivity of the misrecognition data.

12. The apparatus of claim 10, wherein the controller is further configured to determine a similarity based on the pre-stored image information and the weak pattern map, and to classify a weak database based on the determined similarity.

13. The apparatus of claim 12, wherein the controller is further configured to classify the pre-stored image information into the weak database in response to the determined similarity being greater than a predetermined value.

14. The apparatus of claim 10, wherein the object recognition model is a model trained based on a convolutional neural network (CNN).

15. The apparatus of claim 14,
wherein the controller is further configured to select a weak kernel of the object recognition model based on the object recognition model and the weak pattern map, and
wherein the selected weak kernel is trained based on the weak database.

16. The apparatus of claim 15, wherein the controller is further configured:
to determine a sensitivity to the weak pattern map for each kernel of the object recognition model, and
to select, as the weak kernel, a kernel of which the sensitivity is determined as being greater than or equal to a predetermined sensitivity.

17. The apparatus of claim 15, wherein the controller is further configured:
to randomly classify the weak database into a first weak database and a second weak database at a predetermined ratio, and
to train the weak kernel based on the first weak database.

18. The apparatus of claim 17, wherein the controller is further configured:
to determine a performance level of the object recognition model based on the second weak database for each epoch of the training,
when the determined performance level is higher than a predetermined value, to stop the training of the weak kernel.

19. A vehicle including the apparatus of claim 10.

* * * * *